US008319377B2

(12) United States Patent
Beck

(10) Patent No.: US 8,319,377 B2
(45) Date of Patent: Nov. 27, 2012

(54) FUSE FOR DISCONNECTING AN INVERTER FROM A PHOTOVOLTAIC GENERATOR

(75) Inventor: Bernhard Beck, Volkach OT Dimbach (DE)

(73) Assignee: ADENSIS GmbH, Kolitzheim (DE)

( * ) Notice: Subject to any disclaimer, the term of this patent is extended or adjusted under 35 U.S.C. 154(b) by 283 days.

(21) Appl. No.: 12/844,536

(22) Filed: Jul. 27, 2010

(65) Prior Publication Data

US 2011/0031815 A1    Feb. 10, 2011

(30) Foreign Application Priority Data

Aug. 5, 2009    (DE) .................. 10 2009 036 216

(51) Int. Cl.
*H01H 47/00* (2006.01)
(52) U.S. Cl. ......................................................... 307/130
(58) Field of Classification Search .................. 307/125, 307/130; 361/117, 118; 29/623; 337/333, 337/382, 393, 401, 404, 405
See application file for complete search history.

(56) References Cited

U.S. PATENT DOCUMENTS

| 2007/0159745 A1* | 7/2007 | Berberich et al. ............. 361/59 |
| 2007/0159759 A1* | 7/2007 | Chen et al. ................... 361/118 |
| 2009/0097172 A1* | 4/2009 | Bremicker et al. ............... 361/8 |
| 2009/0207543 A1* | 8/2009 | Boniface et al. ............... 361/86 |
| 2010/0128406 A1* | 5/2010 | Ausch ........................... 361/119 |

FOREIGN PATENT DOCUMENTS

| DE | 102005018173 A1 * | 10/2006 |
| DE | 10 2008 029 491 | 12/2009 |
| DE | 102008029491 A1 * | 12/2009 |

* cited by examiner

*Primary Examiner* — Daniel Cavallari
(74) *Attorney, Agent, or Firm* — Henry M. Feiereisen, LLC

(57) ABSTRACT

A photovoltaic system includes an inverter, a photovoltaic generator with a plurality of serially connected photovoltaic modules, said photovoltaic generator connected to the inverter by an electrical supply line, a controllable fuse interconnected in the electrical supply line between the inverter and the photovoltaic generator and having a signal input, and a voltage-dependent resistor connected between the signal input of the controllable fuse and the electrical supply line and generating a control signal which triggers the controllable fuse responsive to the control signal and interrupts the electrical supply line. The controllable fuse can be used to disconnect the electrical connection of the photovoltaic system to the inverter when a switch short-circuiting one or more modules of the photovoltaic generator malfunctions. The arrangement permits operation of photovoltaic system at an operating voltage of close to 1000 V, thereby allowing use of thinner cables.

7 Claims, 3 Drawing Sheets

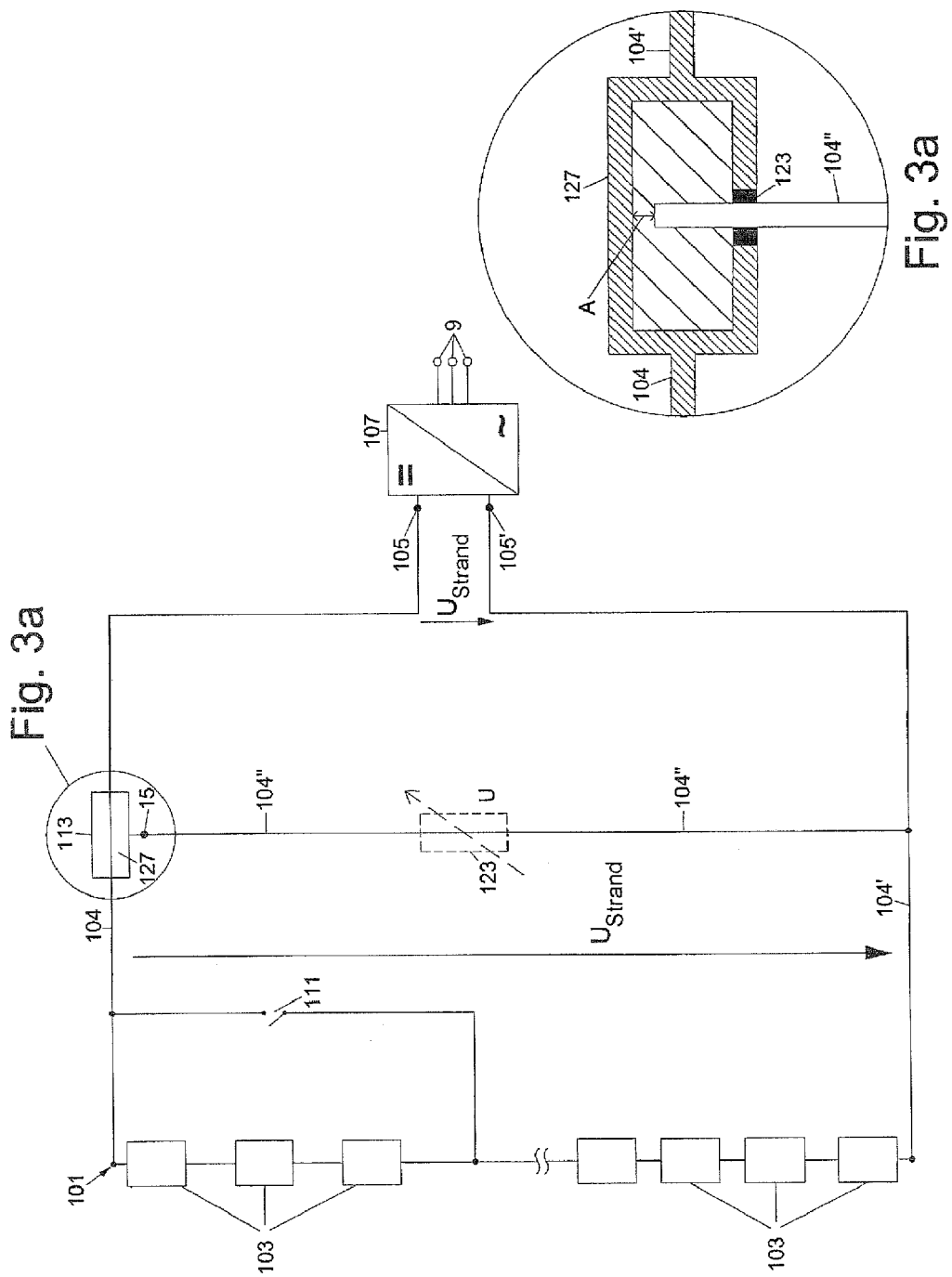

FUSE FOR DISCONNECTING AN INVERTER FROM A PHOTOVOLTAIC GENERATOR

CROSS-REFERENCES TO RELATED APPLICATIONS

This application claims the priority of German Patent Application, Serial No. 10 2009 036 216.9, filed Aug. 5, 2009, pursuant to 35 U.S.C. 119(a)-(d), the content of which is incorporated herein by reference in its entirety as if fully set forth herein.

BACKGROUND OF THE INVENTION

The present invention relates to a photovoltaic system with several serially connected photovoltaic modules connected to an inverter.

The following discussion of related art is provided to assist the reader in understanding the advantages of the invention, and is not to be construed as an admission that this related art is prior art to this invention.

Photovoltaic systems of this type are known in the art. Such systems are typically constructed with a plurality of strands connected in parallel. The maximum number of strands depends on the power output of the inverter connected to the strands. Modern inverters can be designed for a DC input voltage approaching about 900 V.

It is presently customary to construct each strand of the system from eight photovoltaic modules, with each photovoltaic module having 60 photovoltaic cells. Accordingly, 480 cells are connected in series. Each cell has an open-circuit voltage of 1.5 V, which results in a strand voltage of 720 V, which is significantly less than the maximum voltage of 1000 V specified by the manufacturers. If a higher voltage is present, then the modules or the entire system may be destroyed.

During operation of the system, the open circuit voltage of the cells decreases to about 1 to 1.1 V, so that the voltage between the ends of the conventional strands is between 480 V and 510 V. To simplify the discussion, an exemplary operating voltage of 1 V is assumed for each cell in the subsequent figures, corresponding to 60 V across a single photovoltaic module with 60 cells. If the operator of the power grid, to which the photovoltaic system is connected, decide, for whatever reason (e.g., a short circuit in the feeder cable), to remove the photovoltaic system from the grid, then the voltage jumps to the aforementioned 720 V, which is non-critical for the modules and the system.

On the other hand, it would be desirable to operate the photovoltaic modules as well as the inverter under normal operating conditions at a higher voltage than 480-510 V, ideally at the allowable maximum voltage of 1000 V. However, this is not possible because then in oven-circuit situations, a voltage of about 1500 V would result in destruction of the photovoltaic modules, the inverter and the entire system. To this end, a switch arrangement for bridging PV modules is described in applicant's own, as of yet unpublished, German patent application DE 10 2009 016 159. However, a switch arrangement may malfunction and prevent the intended operations to be performed.

It would therefore be desirable and advantageous to provide an improved photovoltaic system to obviate prior art shortcomings which permits operation at a higher operating voltage, so as to ensure that if the voltage increases to an unacceptable high level for whatever reason, this does not cause destruction of the inverter.

SUMMARY OF THE INVENTION

According to one aspect of the present invention, a photovoltaic system includes an inverter, a photovoltaic generator comprising a plurality of serially connected photovoltaic modules, said photovoltaic generator connected to the inverter by an electrical supply line, a controllable fuse interconnected in the electrical supply line between the inverter and the photovoltaic generator and having a signal input, and a voltage-dependent resistor connected between the signal input of the controllable fuse and the electrical supply line and generating a control signal which triggers the controllable fuse responsive to the control signal and interrupts the electrical supply line.

According to another aspect of the invention, a photovoltaic system includes an inverter, a photovoltaic generator comprising a plurality of serially connected photovoltaic modules, said photovoltaic generator connected to the inverter by an electrical connection, and a fuse interconnected in the electrical supply line between the inverter and the photovoltaic generator and comprising a propellant ignitable by a plasma. The fuse is triggered by the plasma and interrupts the electrical connection between the photovoltaic generator and the inverter.

Because the fuse is triggered at a defined voltage, the electric connection between the PV system and the inverter to be protected is safely disconnected before a critical overvoltage is reached at the PV system. This approach can be used with all types of inverters, for example inverters having a purely electronic/electric construction or inverters operated mechanically with a motor/generator set.

It is essential to prevent a short circuit between the PV system and the inverter at any cost, because the photovoltaic system is, compared to a conventional welding apparatus, a vast DC source, which can no longer be controlled during a short circuit and would cause the current-carrying components and everything around them to ignite. Even harmless adhesion of the electrode on a welded piece during a welding operation produces significant heat.

Advantageously, the controllable fuse is a self-destructing fuse, in particular a pyroelectric fuse. The term pyroelectric fuse refers to a fuse in which an explosive propellant is integrated which is ignited when a sufficiently high voltage is applied, thereby permanently interrupting the electrical connection. This is quasi "a last resort" to provide reliable protection, without affecting the operation of the PV system. Such fuses are known in the technical field relating to overcurrent protection.

A simple, but effective embodiment for producing the control signal is provided by the voltage-dependent resistor (varistor) according to the invention. The varistor is connected between the signal input of the fuse and to the supply line from the photovoltaic system to the inverter. It is hereby unimportant where in the supply line the varistor is connected. A suitable simple design of the varistor is an overvoltage protector. For example, an overvoltage protector based on zinc oxide can be provided, wherein the zinc oxide particles break down electrically at a defined voltage. The overvoltage is typically discharged to ground, preferably however to the control input of the fuse, in order to initiate triggering of the fuse.

The control signal is preferably a DC voltage signal in a predetermined range between 900 V and 1200 V, in particular about 1000 V. The breakdown voltage of the overvoltage protector is then advantageously adapted to the trigger voltage of the fuse (corresponding to the permissible maximum voltage for the inverter).

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 shows an embodiment with direct ignition of a propellant by plasma generation based on the potential difference at the PV source.

DETAILED DESCRIPTION OF PREFERRED EMBODIMENTS

Figure 1:
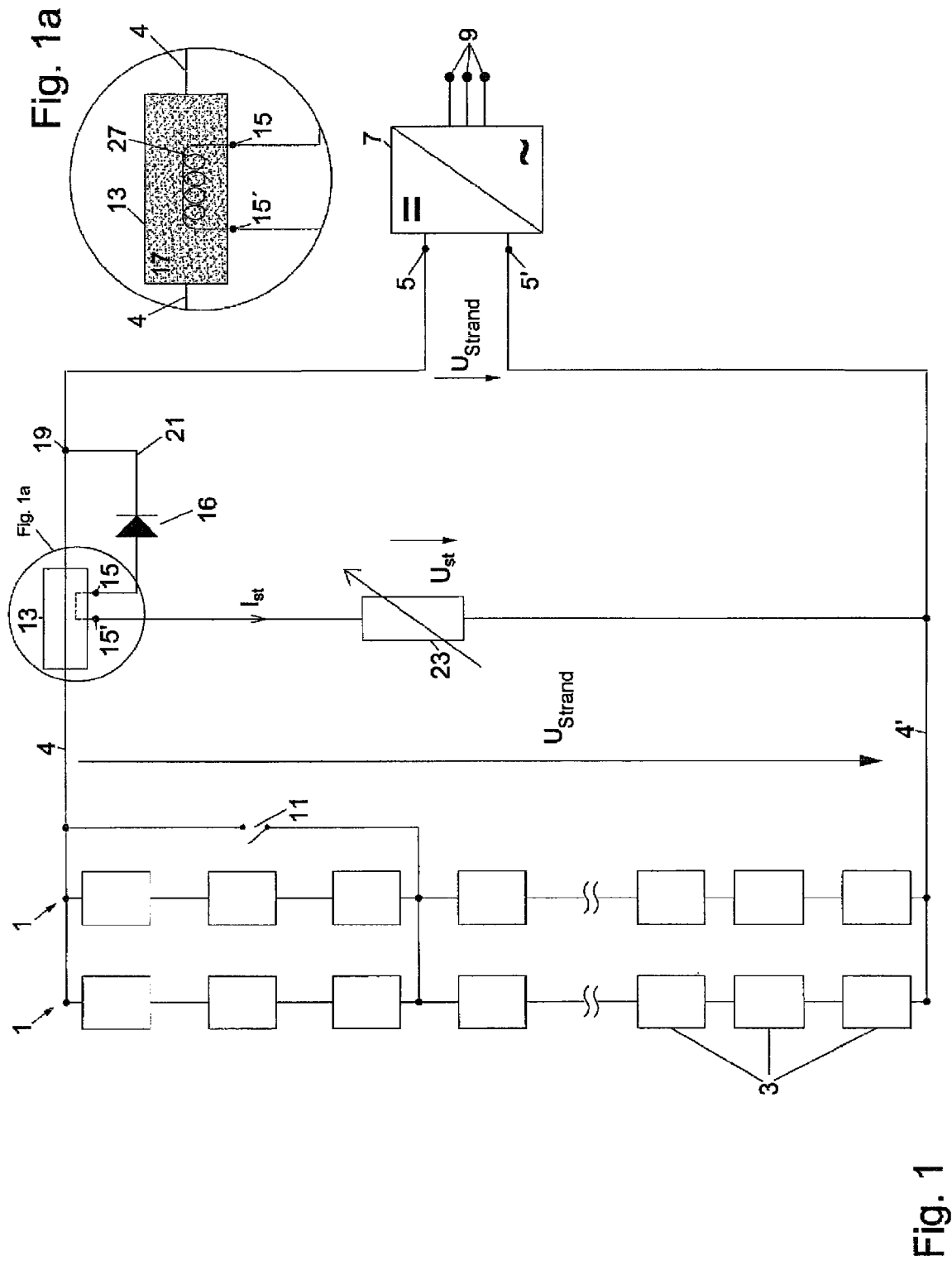
FIG. 1 is a schematic diagram of a strand of a photovoltaic system with short circuit switch for PV modules and with a controllable fuse according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a conventional photovoltaic generator with a plurality of strands 1 connected in parallel. Each strand 1 has serially connected photovoltaic modules 3. Each photovoltaic module 3 has serially connected photovoltaic cells. Typically, a photovoltaic module 3 employs, for example, 60 cells having each an open circuit voltage of 1.5 V, or 130 cells having each an open circuit voltage of 0.69 V. The overall voltage in both cases is about 90 V across the module 3, i.e., about 720 V across a strand 3 assuming eight modules, as presently used in conventional designs. During operation, this voltage is reduced to about 60 to 65 V per module 3, resulting in a strand voltage $U_{St}$ of 480 to 510 V.

The respective ends of several parallel-connected strands 3 are connected to the input terminals 5, 5' of an inverter 7, with the output 9 of the inverter 7 supplying the generated current, for example, to a power grid.

The open circuit voltage of 720 V is significantly lower than the allowable limit of 1000 V presently listed by the manufacturers of photovoltaic modules as an upper limit for their product. During operation, a still larger safety margin to the 1000 V is attained. It is desirable with conventional systems of this type to fully take advantage of the permissible maximum voltage of 1000 V in order to keep the cross section of the laid cables as small as possible.

For this purpose, the photovoltaic system according to FIG. 1 uses a short circuit switch 11. The strand 1 is here shown with 16 photovoltaic modules 3, which are connected in parallel with other strands 3 which are only partially shown. The respective strand ends are routed via two electrical lines 4, 4' to the input terminals 5, 5' of the inverter 7. Based on the 16 PV modules 3 per strand 1, an impermissible high operating voltage of 960 to 1020 V is present at one module 3 and at the input 5 of the inverter 7. An excess voltage of 20 V above the allowable limit is still regarded as tolerable.

To prevent destruction of the inverter 7 and the module 3 upon disconnection from the power grid, the short-circuit switch 11 is provided. The switch 11 is designed to short-circuit from one tenth, in particular from one quarter to one half of the modules 3. The switch 11 is controlled by a limit detector (not shown) which determines when the voltage across the strand 1 exceeds the predetermined value, in this example 1000 V, and then bridges the predetermined portion of the modules 3, in order to limit the voltage on the inverter input 5 to less than 1000 V.

In the photovoltaic system described so far, a malfunction of the switch 11 would cause damage to, or even total loss of, the modules 3 and the inverter 7. To prevent this from happening, a fuse 13 is provided in the electric connecting line 4 between the positive terminal of the last PV module 3 in the strand 1 and the positive input terminal 5 of the inverter 7. The fuse 13 has a trigger input or controllable input 15 which is connected to an ignition device, for example a so-called ignition pill. When a corresponding ignition or control signal $U_{St}$ is applied to the input 15, the fuse 13 is triggered. The input 15 is configured as a potential input having the potential of the line 4'. The trigger input 15 is configured as a two-pole input 15, 15', wherein the second pole 15' is connected to the supply line 4', with the control signal $U_{St}$ being supplied as a trigger voltage. In this way, a sort of "last resort" is installed, which offers definitive protection, without interfering with the actual operating state of the PV system.

The control signal $U_{St}$ can be generated separately by current and/or voltage converters, amplifier circuits, etc. Advantageously, the control signal $U_{St}$ is generated directly at the electrical supply line 4. The supply line 4 is provided with a branch 19 located on the line segment of the electrical supply line 4 between the short-circuit switch 11 and the positive input terminal 5 of the inverter 7. An electrical connection 21 extends from the branch 19 to a voltage-dependent resistor and/or voltage-dependent semiconductor 23, continuing to the control input 15 of the fuse 13. In particular when the fuse 13 is a pyroelectric fuse, in which a voltage pulse triggers an explosive propellant, the voltage-dependent resistor/semiconductor 23 should be able to transmit a certain power. To this end, overvoltage protectors can be employed which are substantially non-conducting during normal operation at a nominal voltage and only become conducting when a limit voltage is exceeded, whereafter they transmit the applied voltage.

When the fuse 13 is triggered, it must be replaced before operation of the photovoltaic system can continue.

Figure 2:
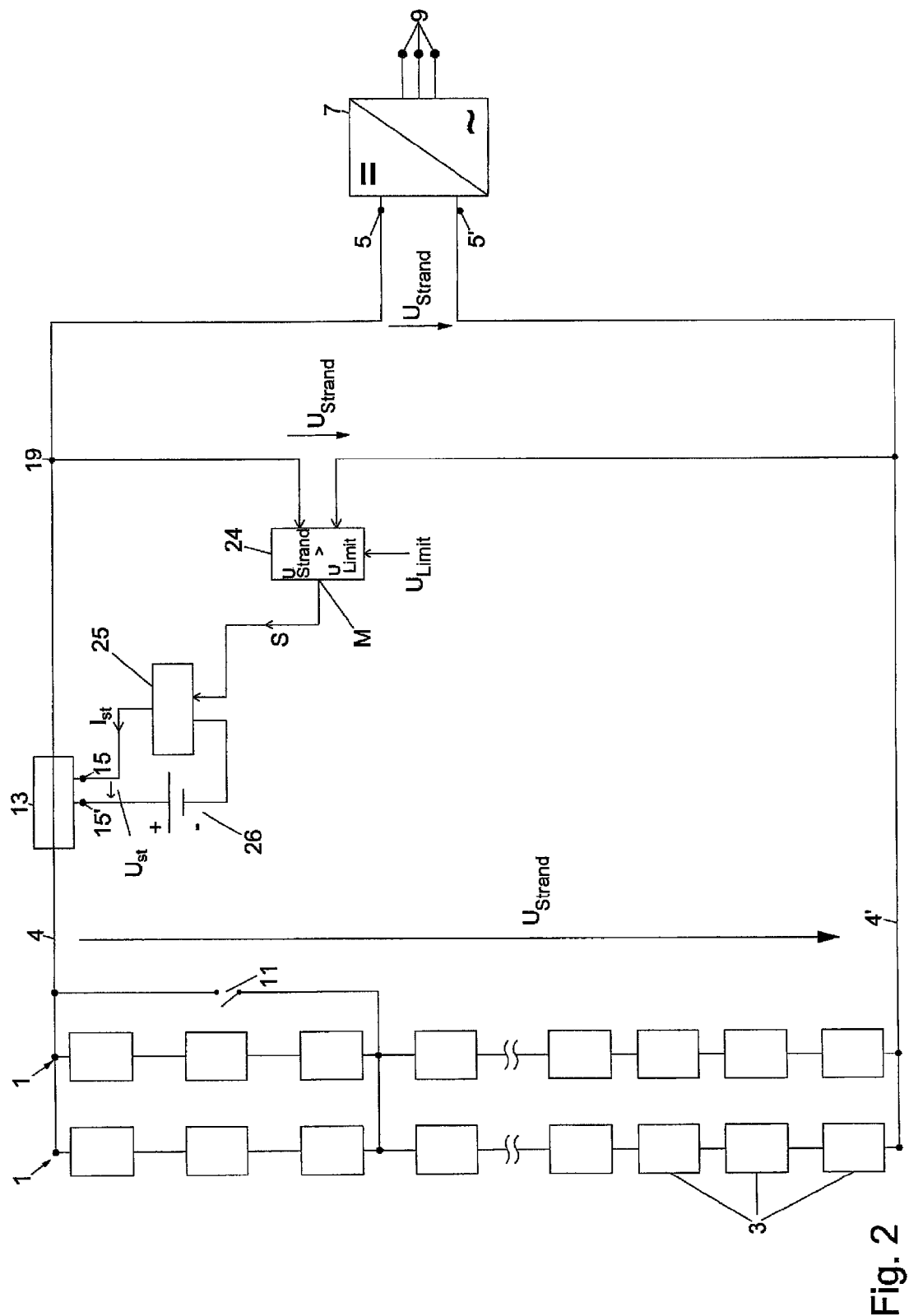
FIG. 2 shows an alternative, potential-free control with separate control device and overvoltage detection with signal output.

Another embodiment is shown in FIG. 2, where the trigger signal 15 is generated by a control unit 25 which is controlled by a control signal ($U_{St}$) and produces the required current for triggering the fuse. A device 24 with a signal output is used for detecting an overvoltage. The device 24 then connects the changeover contact which is connected to an external voltage supply 26 to the control unit 25.

FIG. 3 shows an embodiment with direct ignition of a propellant via plasma generation based on the potential difference at a PV source 103. Identical elements are labeled with reference numerals that are augmented by 100, i.e. a previous 3 becomes 103, a previous 11 becomes 111, etc.

The most significant change is here that the fuse is no longer triggered by a control or trigger signal which controls a bridge igniter, or which ignites an ignition pill, which subsequently initiates in the propellant for exploding the supply line 4, but directly (initiating triggering), because the maximum permissible voltage on the inverter 107 has been exceeded. In the embodiment of FIG. 3, an electrical connection 104" between a supply line 104' to the first supply line 104 is provided by way of a dielectric operating as a resistor, for example the propellant 127. The electrical connection line 104" terminates inside the dielectric at a predetermined distance A from the supply line 104. The distance A is dimensioned so that no electric current flows between the supply line 104 and the connection line 104" before a limit voltage is reached, because the electrical resistance of the dielectric 127 prevents this current flow. This situation changes when the maximum permissible voltage of the inverter 107 is reached, which is used as a limit or breakdown voltage for designing for distance. Based on the potential difference between the supply lines 104, 104', a short circuit with plasma generation is formed, which ignites the propellant 127 and interrupts the supply line 104. In lieu of the penetration of the connection line 104" into the propellant 127, an isolator 129 is provided, if electrically conducting parts are located proximate to the feedthrough location.

The overvoltage protector 123 indicated in FIG. 3 by a dashed line is optional and is used to allow a substantial tolerance when calculating the distance. With the interconnected overvoltage protector 123, a very small defined distance can be selected, for example a distance small enough so that a potential difference of 100 V would already provoke a short-circuit. While these 100 V are not present under normal conditions due to the high resistance of the overvoltage protector 123, they occur only when a voltage above the breakdown voltage of the overvoltage protector renders the overvoltage protector conducting and the potential, for example the 900 to 1000 V, are applied to the termination of the connecting line 104" in the propellant. This high voltage (compared to the breakdown voltage sized for plasma formation across a predetermined distance of 100 V) results in a reliable breakdown in the material of the propellant and ignites the propellant.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A photovoltaic system comprising:
    an inverter,
    a photovoltaic generator comprising a plurality of serially connected photovoltaic modules, said photovoltaic generator connected to the inverter by an electrical supply line,
    a controllable fuse interconnected in the electrical supply line between the inverter and the photovoltaic generator and having a signal input, and
    a voltage-dependent resistor connected between the signal input of the controllable fuse and the electrical supply line and generating a control signal which triggers the controllable fuse responsive to the control signal and interrupts the electrical supply line.

2. The photovoltaic system of claim 1, wherein the controllable fuse is a self-destructing fuse.

3. The photovoltaic system of claim 2, wherein the controllable fuse is a pyroelectric fuse.

4. The photovoltaic system of claim 1, wherein the controllable fuse is an overvoltage protector.

5. The photovoltaic system of claim 4, further comprising a control unit, wherein the overvoltage protector has a signal output which provides a second signal when the overvoltage protector is triggered, which second signal is supplied to the control unit which generates from the second signal the control signal.

6. The photovoltaic system of claim 4, wherein the overvoltage protector is constructed based on zinc oxide.

7. The photovoltaic system of claim 5, wherein the control signal is a DC voltage signal providing a DC current between 2 A and 5 A for a duration of at least 10 ms.

* * * * *